(12) United States Patent
Doyle et al.

(10) Patent No.: US 11,653,681 B2
(45) Date of Patent: May 23, 2023

(54) PARTICULATE MEAT SEASONING COMPOSITION

(71) Applicant: Conopeo Inc., Englewood Cliffs, NJ (US)

(72) Inventors: John Gerard Doyle, Heilbronn (DE); Volker Jonas, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 663 days.

(21) Appl. No.: 16/469,163

(22) PCT Filed: Nov. 15, 2017

(86) PCT No.: PCT/EP2017/079334
§ 371 (c)(1),
(2) Date: Jun. 13, 2019

(87) PCT Pub. No.: WO2018/108425
PCT Pub. Date: Jun. 21, 2018

(65) Prior Publication Data
US 2020/0015503 A1   Jan. 16, 2020

(30) Foreign Application Priority Data

Dec. 15, 2016  (EP) .................................. 16204359.0

(51) Int. Cl.
| | | |
|---|---|---|
| *A23L 13/00* | (2016.01) | |
| *A23L 7/10* | (2016.01) | |
| *A23L 27/22* | (2016.01) | |
| *A23L 27/40* | (2016.01) | |
| *A23L 27/14* | (2016.01) | |
| *A23L 19/00* | (2016.01) | |
| *A23L 31/15* | (2016.01) | |

(52) U.S. Cl.
CPC .............. *A23L 13/03* (2016.08); *A23L 7/198* (2016.08); *A23L 19/01* (2016.08); *A23L 27/14* (2016.08); *A23L 27/22* (2016.08); *A23L 27/40* (2016.08); *A23L 31/15* (2016.08)

(58) Field of Classification Search
CPC .......... A23L 13/03; A23L 7/198; A23L 27/22; A23L 27/40; A23L 27/14; A23L 19/01; A23L 31/15
USPC ........................................................ 426/292
See application file for complete search history.

(56) References Cited

U.S. PATENT DOCUMENTS

| | | | | |
|---|---|---|---|---|
| 5,415,883 | A | * | 5/1995 | Leu .......................... A23L 13/03 426/293 |
| 6,214,403 | B1 | | 4/2001 | Broberg et al. |
| 2005/0048189 | A1 | | 3/2005 | Lombard et al. |
| 2007/0202217 | A1 | | 8/2007 | Zukerman |
| 2010/0086612 | A1 | | 4/2010 | Frambol et al. |
| 2013/0259988 | A1 | | 10/2013 | Burns et al. |

FOREIGN PATENT DOCUMENTS

| | | |
|---|---|---|
| CN | 1949986 | 3/2005 |
| CN | 101999616 | 9/2009 |
| CN | 102595933 | 8/2010 |
| CN | 102396687 | 9/2010 |
| CN | 102524732 | 12/2010 |
| CN | 102665442 | 12/2010 |
| CN | 104 381 971 A | 3/2015 |
| EP | 0 669 084 A1 | 8/1995 |
| EP | 0669084 | 8/1995 |
| GB | 1467873 A | 3/1977 |
| JP | 4088957 | 3/1992 |
| JP | 5316971 A | 3/1993 |

(Continued)

OTHER PUBLICATIONS

Jamie Oliver; Super Speedy Fiery Jerk Rub Mix; Sep. 1, 2014.
LIDL; Tuscan Style Oven Fish Fillet Seasoning Mix; Jan. 1, 2016.
KNORR; Seasoning for Goulash with Chicken; Nov. 1, 2016.

(Continued)

*Primary Examiner* — Brent T O'Hern
(74) *Attorney, Agent, or Firm* — N.V. Nederlandsch Octrooibureau

(57) ABSTRACT

The invention relates to a particulate meat seasoning composition comprising:
a) 10-70 wt. % of farinaceous component comprising:
  5-30% by weight of the farinaceous component of semolina component having a particle size of more than 100 μm to 1,200 μm, said semolina component being selected from wheat semolina, rice semolina, maize semolina, rye semolina, tapioca semolina and combinations thereof;
  70-95% of by weight of the farinaceous component of flour component having a particle size of 10 μm to 100 μm, said flour component being selected from wheat flour, rice flour, maize flour, rye flour, tapioca flour and combinations thereof;
b) 30-90 wt. % of one or more seasoning ingredients selected from sodium chloride, potassium chloride, sodium glutamate, spices, herbs, vegetables, fruit, sucrose and yeast extract, inosine 5'-monophosphate, guanosine 5'-monophosphate and protein hydrolysate;
wherein the farinaceous component has a multimodal particle size distribution with at least one maximum below 100 μm and at least one maximum above 100 μm.

This particulate meat seasoning composition that can suitably be applied onto meat products, such as steaks and bigger cuts of meat, before these meat products are cooked, e.g. by pan frying and/or roasting in the oven. The seasoning composition not only improves the flavour of the cooked meat product, but also improves the juiciness of the cooked, ready-to-eat meat product.

11 Claims, No Drawings

(56) References Cited

FOREIGN PATENT DOCUMENTS

| JP | 10191925 A | 7/1998 |
|---|---|---|
| JP | 2001204407 A | 7/2001 |
| JP | 2002051718 | 2/2002 |
| JP | 2014138578 A1 | 7/2014 |
| KR | 2004 0071846 A | 8/2004 |
| WO | WO02085136 | 10/2002 |
| WO | 2013054460 A1 | 4/2013 |
| WO | WO2014149913 | 9/2014 |
| WO | WO2016012263 | 1/2016 |

OTHER PUBLICATIONS

Punjabi Chicken Curry Seasoning; Mintel GNPD; 2015; XP055338579 retrieved on Jan. 25, 2017 http://www.gnpd.com/sinatra/recordpage/2888153/from_search/2tfGjMTmeL/?page=1.

Anonymous: GNPD—Punjabi Chicken Curry Seasoning, Jan. 1, 2015 (Jan. 1, 2015), XP055338579, Retrieved from the Internet: URL:http://www.gnpd.com/sinatra/recordpage/2888153/fromsearch/2tfGjMTmeL/?page=1 [retrieved on Jan. 25, 2017] abstract.

* cited by examiner

PARTICULATE MEAT SEASONING COMPOSITION

TECHNICAL FIELD OF THE INVENTION

The present invention relates to a particulate meat seasoning composition comprising:
a) 10-70 wt. % of farinaceous component comprising:
   5-30% by weight of the farinaceous component of semolina component having a particle size of more than 100 µm to 1,200 µm, said semolina component being selected from wheat semolina, rice semolina, maize semolina, rye semolina, tapioca semolina and combinations thereof;
   70-95% of by weight of the farinaceous component of flour component having a particle size of 10 µm to 100 µm, said flour component being selected from wheat flour, rice flour, maize flour, rye flour, tapioca flour and combinations thereof;
b) 30-90 wt. % of one or more seasoning ingredients selected from sodium chloride, potassium chloride, sodium glutamate, spices, herbs, vegetables, fruit, sucrose, yeast extract, inosine 5'-monophosphate, guanosine 5'-monophosphate and protein hydrolysate;
c) wherein the farinaceous component has a multimodal particle size distribution with at least one maximum below 100 µm and at least one maximum above 100 µm.

The particulate seasoning composition according to the invention can be applied onto the surface of meat products before e.g. pan frying or oven roasting. Not only does the seasoning composition improve the taste and appearance of the cooked meat product, but it also improves the juiciness of the ready-to-eat product.

BACKGROUND OF THE INVENTION

Seasonings are commonly used to enhance the flavour of food products, such as meat products, snacks, salads, etc. Examples of seasonings that are used in the preparation of meat products include seasoning rubs and marinades.

Seasoning rubs are particulate meat seasonings that typically are largely composed of spices and herbs.

Wheat semolina is the coarse, purified wheat middlings of wheat. The middlings of wheat semolina typically have a particle size in the range of 100 to 1,200 µm. Wheat semolina contains about 73 grams carbohydrates (including appr. 4 g dietary fibre), 1 g fat and 13 g protein. Wheat semolina is sometimes used to coat slices of fish before they are pan-fried in oil, to provide a crispy coating.

Broadly speaking, meal produced from grains other than wheat may also be referred to as semolina, e.g. rice semolina, or maize semolina (more commonly known as grits in the U.S.).

Semolina made from durum wheat is yellow in color. When semolina comes from softer types of wheats, it is white in color.

It is known to use wheat semolina in combination with herbs, spices and salt in the preparation of meat balls.

A curry seasoning product (Punjabi Chicken Curry Seasoning) is described in the Mintel Global New Products Database. The information provided shows that the product was commercially available in 2015 and that it contained semolina and refined wheat flour.

U.S. Pat. No. 5,415,883 describes a low temperature method of preparing a precooked meat consisting essentially of:
   coating a meat with a liquid marinade;
   coating the meat with a dry marinade comprising:
      i) 20-60 wt. % a farinaceous material and
      ii) 40-80 wt. % salt;
   cooking the coated meat; and
   freezing the coated meat after the cooking step.

EP-A 0 669 084 describes a process for preparing a coated microwaveable meat which will be juicy and tender after microwave cooking, comprising the steps of:
   intimately contacting the meat with an aqueous solution having a pH of 5.0-9.0 and a cation normality ratio of $Na^+/K^+/Ca^{++}$ of 2-10/1-6/1-4, the contact continuing until the water gain in the meat is at least 8% of the initial weight of the meat; and
   thereafter applying to the meat a dry, powdery coating agent including starch and protein;
whereby, during subsequent microwave cooking of the meat, the coating agent forms a starch-and-protein crosslinked continuous skin-like film which controls the heating rate and the microwave penetration depth. The coating agent includes by weight 10-25% egg albumen, 5-20% isolated vegetable protein, 10-30% flour, 3-15% pregelled starch, and 5-35% chloride salts.

SUMMARY OF THE INVENTION

The inventors have developed a particulate meat seasoning composition that can suitably be applied onto meat products, such as steaks and bigger cuts of meat, before these meat products are cooked, e.g. by pan frying and/or roasting in the oven. The seasoning composition of the present invention not only improves the flavour of the cooked meat product, but unexpectedly, application of the seasoning composition prior to cooking also improves the juiciness of the cooked, ready-to-eat meat product.

The particulate meat seasoning composition according to the present invention comprises:
a) 10-70 wt. % of farinaceous component comprising:
   5-30% by weight of the farinaceous component of semolina component having a particle size of more than 100 µm to 1,200 µm, said semolina component being selected from wheat semolina, rice semolina, maize semolina, rye semolina, tapioca semolina and combinations thereof;
   70-95% of by weight of the farinaceous component of flour component having a particle size of 10 µm to 100 µm, said flour component being selected from wheat flour, rice flour, maize flour, rye flour, tapioca flour and combinations thereof;
b) 30-90 wt. % of one or more seasoning ingredients selected from sodium chloride, potassium chloride, sodium glutamate, spices, herbs, vegetables, fruit, sucrose and yeast extract, inosine 5'-monophosphate, guanosine 5'-monophosphate and protein hydrolysate;
wherein the farinaceous component has a multimodal particle size distribution with at least one maximum below 100 µm and at least one maximum above 100 µm.

The inventors have discovered that the small amount of the semolina component and flour component in the particulate seasoning composition of the present invention effectively minimizes moisture loss from the meat product during cooking, especially during pan frying or oven roasting.

The present invention also relates to the use of the aforementioned seasoning composition for seasoning meat products, said use comprising pan frying of oven roasting of the seasoned meat product.

The invention further pertains to a process of preparing a seasoning composition, said process comprising combining the following components:
- 5-30 parts by weight of semolina component having a particle size of more than 100 μm to 1,200 μm, said semolina component being selected from wheat semolina, rice semolina, maize semolina, rye semolina, tapioca semolina and combinations thereof;
- 70-95 parts by weight of flour component having a particle size of 10 μm to 100 μm, said flour component being selected from wheat flour, rice flour, maize flour, rye flour, tapioca flour and combinations thereof; and
- 45-900 parts by weight of one or more other seasoning ingredients selected from sodium chloride, potassium chloride, sodium glutamate, spices, herbs, vegetables, fruit, sucrose, yeast extract and protein hydrolysate.

Finally, the invention provides a package comprising a container holding a seasoning composition according to the present invention and printed instructions for using the seasoning composition by applying it onto the surface of a meat product before pan frying.

DETAILED DESCRIPTION OF THE INVENTION

A first aspect of the present invention relates to a particulate meat seasoning composition comprising:
a) 10-70 wt. % of farinaceous component comprising:
  - 5-30% by weight of the farinaceous component of semolina component having a particle size of more than 100 μm to 1,200 μm, said semolina component being selected from wheat semolina, rice semolina, maize semolina, rye semolina, tapioca semolina and combinations thereof;
  - 70-95% of by weight of the farinaceous component of flour component having a particle size of 10 μm to 100 μm, said flour component being selected from wheat flour, rice flour, maize flour, rye flour, tapioca flour and combinations thereof;
b) 30-90 wt. % of one or more seasoning ingredients selected from sodium chloride, potassium chloride, sodium glutamate, spices, herbs, vegetables, fruit, sucrose, yeast extract, inosine 5'-monophosphate, guanosine 5'-monophosphate and protein hydrolysate;
wherein the farinaceous component has a multimodal particle size distribution with at least one maximum below 100 μm and at least one maximum above 100 μm.

The term "particulate" as used herein in relation to a material, refers to a material that consists of discrete particles.

The term "fat" as used herein refers to glycerides selected from triglycerides, diglycerides, monoglycerides, fatty acids, phosphoglycerides and combinations thereof.

The particle size distribution of the present seasoning composition or of ingredients employed in this seasoning composition can suitably be determined with the help of a set of sieves of different mesh sizes.

The semolina component and the flour component of the present seasoning composition can have essentially the same composition, e.g. when these components originate from the same cereal source, in which case the particles in these two components only differ in particle size, i.e. particles with a size in the range of 10-100 μm belong to the flour component, and particles having a size of more than 100 μm up to 1,200 μm belong to the semolina component.

Whenever reference is made herein to water content, unless indicated otherwise, said water content includes unbound (free) as well as bound water.

Unless indicated otherwise, all percentages mentioned herein are weight percentages, i.e. % (w/w).

The particulate seasoning composition of the present invention typically contains at least 90 wt. % particles having a particle size of at least 10 μm, more preferably in the range of 20 to 3,000 μm and most preferably in the range of 30 to 2,000 μm.

The mass weighted average particle size of the seasoning composition preferably lies in the range of 40-1,200 μm, more preferably in the range of 50-1,000 μm and most preferably in the range of 60-800 μm.

The combination of the farinaceous component and the one or more seasoning ingredients preferably constitutes at least 75 wt. %, more preferably at least 80 wt. % and most preferably at least 90 wt. % of the particulate seasoning composition.

The water content of the meat seasoning composition of the present invention preferably does not exceed 10 wt. %, more preferably it does not exceed 8 wt. %.

Preferably, seasoning composition has a water activity of less than 0.45, more preferably in the range of 0.25 to 0.4.

The seasoning composition of the present invention preferably contains 12-50 wt. %, more preferably 15-40 wt. % of the farinaceous component.

The farinaceous component preferably comprises 10-25% by weight of the farinaceous component of semolina component having a particle size of more than 100 μm to 1,200 μm.

The semolina component is preferably selected from wheat semoline, rice semolina and combinations thereof. According to a particularly preferred embodiment, the semolina component is wheat semolina, most preferably soft wheat semolina.

The seasoning composition preferably contains at least 1 wt. %, more preferably at least 1.2 wt. % semolina component, especially wheat semolina, more particularly soft wheat semolina. The amount of semolina component in the seasoning composition preferably does not exceed 6 wt. %.

The farinaceous component of the seasoning composition comprises a combination of a coarse semolina component and a fine flour component. Preferably, the farinaceous component has a multimodal particle size distribution with at least one maximum below 90 μm. Preferably, the farinaceous component has a multimodal size distribution with at least one maximum above 120 μm, preferably above 150 μm.

The flour component having a particle size of 10-100 μm is preferably contained in the farinaceous component in a concentration of 75-88% of by weight of the farinaceous component.

The flour component is preferably selected from one or more flours selected from wheat flour, rice flour and combinations thereof. According to a particularly preferred embodiment, the flour component comprises a mixture of wheat flour and rice flour, more preferably the flour component comprises 50-80% by weight of the flour component of wheat flour and 20-50% by weight of the flour component of rice flour.

Preferably, the combination of wheat flour and rice flour constitutes at least 80 wt. %, more preferably at least 95 wt. % of the flour component.

The particulate seasoning composition of the present invention preferably comprises at least 50 wt. %, more preferably at least 60 wt. %, most preferably at least 65 wt. % of the one or more seasoning ingredients.

According to a particularly preferred embodiment, the particulate seasoning composition comprises 5-50 wt. %, more preferably 8-30 wt. % of plant material selected from spices, herbs, vegetables, fruit and combinations thereof.

Spices and/or herbs are preferably are contained in the particulate seasoning composition in a concentration of at least 5 wt. %, more preferably of at least 7 wt. %, most preferably in the range of 8-30 wt. %.

Examples of spices and herbs that may be contained in the seasoning composition include garlic, onion, paprika, ginger, chili powder, oregano, sage, dill weed, basil, fennel, mustard seed, lemon powder, nutmeg, cumin, rosemary, thyme, parsley, marjoram, paprika, black pepper, cayenne pepper, clove, cardamom, curry and combinations thereof.

Preferably, the seasoning composition comprises 20-65 wt. %, more preferably 25-60 wt. % and most preferably 30-55 wt. % of salt selected from sodium chloride, potassium chloride, monosodium glutamate and combinations thereof.

The fat content of the seasoning composition is preferably in the range of 0-10 wt. %, more preferably of 0-3 wt. %.

Another aspect of the present invention relates to the use of the particulate meat seasoning composition of the present invention for seasoning meat products, said use comprising pan frying or oven roasting of the seasoned meat product.

Preferably, the seasoning composition is applied onto the surface of the meat product in an amount of 1 to 10 grams per 100 grams of meat product, prior to pan frying or oven roasting.

A further aspect of the invention relates to a process of preparing a seasoning composition, said process comprising combining the following components:
- 5-30 parts by weight of semolina component having a particle size of more than 100 μm to 1,200 μm, said semolina component being selected from wheat semolina, rice semolina, maize semolina, rye semolina, tapioca semolina and combinations thereof;
- 70-95 parts by weight of flour component having a particle size of 10 μm to 100 μm, said flour component being selected from wheat flour, rice flour, maize flour, rye flour, tapioca flour and combinations thereof; and
- 45-900 parts by weight, preferably 100-800 parts by weight of one or more other seasoning ingredients selected from sodium chloride, potassium chloride, sodium glutamate, spices, herbs, vegetables, fruit, sucrose, yeast extract, inosine 5'-monophosphate, guanosine 5'-monophosphate and protein hydrolysate.

The semolina component, flour component and seasoning ingredients employed in the present process are preferably as described herein before.

According to a particularly preferred embodiment, the present process yields a particulate meat seasoning composition as described herein before.

Yet another aspect of the invention relates to a package comprising a container holding a particulate seasoning composition according to the present invention and printed instructions for using the seasoning composition by applying it onto the surface of a meat product before cooking the meat product, preferably cooking the meat product by pan frying or oven roasting.

The container holding the particulate seasoning composition preferably is a sachet or a pouch.

The invention is further illustrated by the following non-limiting examples.

EXAMPLES

Example 1

Seasoning compositions were prepared on the basis of the recipes shown in Table 1.

TABLE 1

| Ingredients | Wt. % | | | | | |
| --- | --- | --- | --- | --- | --- | --- |
|  | 1 | 2 | 3 | 4 | 5 | 6 |
| Spices (paprika, black pepper, cayenne pepper, onion, garlic) | 10.0 | 10.0 | 10.0 | 10.0 | 10.0 | 10.0 |
| Herbs (parsley, rosemary, thyme, marjoram) | 2.5 | 2.5 | 2.5 | 2.5 | 2.5 | 2.5 |
| Tomato powder | 1.6 | 1.6 | 1.6 | 1.6 | 1.6 | 1.6 |
| Sodium chloride | 21.7 | 21.7 | 21.7 | 21.7 | 21.7 | 21.7 |
| Sugar | 1.6 | 1.6 | 1.6 | 1.6 | 1.6 | 1.6 |
| Fat | 0.7 | 0.7 | 0.7 | 0.7 | 0.7 | 0.7 |
| Monosodium glutamate | 21.9 | 21.9 | 21.9 | 21.9 | 21.9 | 21.9 |
| Wheat flour | 40.0 |  |  | 20.0 | 20.0 | 26.4 |
| Rice flour |  | 40.0 |  | 20.0 |  | 6.8 |
| Soft wheat semolina |  |  | 40.0 |  | 20.0 | 6.8 |

These seasoning compositions were used to prepare pan fried pork steaks. Five trials were done in which each of the seasoning 1 to 5 was paired with seasoning 6 and in which the effect on weight loss (water evaporation) and juiciness was determined.

The pork steaks had a weight of 125-150 g and a thickness of approximately 1.5 cm. The seasoning compositions were mixed with one tablespoon of oil and then in total 3-4 grams of the mix was applied on both sides of the meat. Next, the pork steaks were fried in a pan for two minutes each side, following which the steaks were finished in the oven at 160° C. for eight minutes.

The pork steaks were weighed immediately before frying and immediately after they had been taken from the oven to determine the weight loss. Furthermore, the pairs of steaks were evaluated by an expert panel who indicated which of the two seasonings tested had produced the most juicy steak. The results of these evaluations are shown in Tables 2a to 2e.

TABLE 2a

| Seasoning | Weight raw meat | Weight after marination | Weight after frying/oven | % water loss | Most juicy |
|---|---|---|---|---|---|
| 1 | 139.9 | 144 | 116 | 19.4 | |
| 6 | 134 | 137 | 112.5 | 17.9 | X |

TABLE 2b

| Seasoning | Weight raw meat | Weight after marination | Weight after frying/oven | % water loss | Most juicy |
|---|---|---|---|---|---|
| 2 | 140 | 145 | 115 | 20.7 | |
| 6 | 135 | 138 | 114 | 17.4 | X |

TABLE 2c

| Seasoning | Weight raw meat | Weight after marination | Weight after frying/oven | % water loss | Most juicy |
|---|---|---|---|---|---|
| 3 | 138 | 143 | 116 | 18.9 | |
| 6 | 138 | 143 | 118 | 17.5 | X |

TABLE 2d

| Seasoning | Weight raw meat | Weight after marination | Weight after frying/oven | % water loss | Most juicy |
|---|---|---|---|---|---|
| 4 | 139 | 144 | 115 | 20.1 | |
| 6 | 139 | 144 | 117 | 18.8 | X |

TABLE 2e

| Seasoning | Weight raw meat | Weight after marination | Weight after frying/oven | % water loss | Most juicy |
|---|---|---|---|---|---|
| 5 | 138 | 141 | 115 | 18.4 | |
| 6 | 137 | 141 | 117 | 17.0 | X |

Example 2

Seasoning compositions were prepared on the basis of the recipes shown in Table 3.

TABLE 1

| | Wt. % | |
|---|---|---|
| Ingredients | 1 | 2 |
| Spices (paprika, black pepper, cayenne pepper, onion, garlic) | 10.0 | 7.1 |
| Herbs (parsley, rosemary, thyme, marjoram) | 2.5 | 1.8 |
| Tomato powder | 1.6 | 1.1 |
| Sodium chloride | 21.7 | 15.6 |
| Sugar | 1.6 | 1.1 |
| Fat | 0.7 | 0.5 |
| Monosodium glutamate | 21.9 | 15.7 |
| Wheat flour | 26.4 | 37.7 |
| Rice flour | 6.8 | 9.7 |
| Soft wheat semolina | 6.8 | 9.7 |

These seasoning compositions were used to prepare pan fried pork steaks in the same way as described in Example 1. The weight loss that occurred during the preparation of the steaks was also determined in the same way as in Example 1. The results are shown in Table 4.

TABLE 4

| Seasoning | Weight raw meat | Weight after marination | Weight after frying/oven | % water loss |
|---|---|---|---|---|
| 1 | 135 | 138 | 114 | 17.4 |
| 2 | 139 | 142 | 121 | 14.8 |

The invention claimed is:

1. A particulate meat seasoning composition comprising:
   a) 10-70 wt. % of farinaceous component comprising:
      5-30% by weight of the farinaceous component of semolina component having a particle size of more than 100 μm to 1,200 μm, said semolina component being selected from wheat semolina, rice semolina, maize semolina, rye semolina, tapioca semolina and combinations thereof;
      70-95% of by weight of the farinaceous component of flour component having a particle size of 10 μm to 100 μm, said flour component being selected from wheat flour, rice flour, maize flour, rye flour, tapioca flour and combinations thereof;
   b) 30-90 wt. % of one or more seasoning ingredients selected from sodium chloride, potassium chloride, sodium glutamate, spices, herbs, vegetables, fruit, sucrose, yeast extract, inosine 5'-monophosphate, guanosine 5'-monophosphate and protein hydrolysate;
   wherein the farinaceous component has a multimodal particle size distribution with at least one maximum below 100 μm and at least one maximum above 100 μm.

2. The seasoning composition according to claim 1, wherein the semolina component is wheat semolina.

3. The seasoning composition according to claim 1, wherein the flour component comprises 50-80% by weight of the flour component of wheat flour and 20-50% by weight of the flour component of rice flour.

4. The seasoning composition according to claim 1, wherein the seasoning composition comprises at least 50 wt. % of the one or more seasoning ingredients.

5. The seasoning composition according to claim 1, wherein the combination of the farinaceous component and the one or more seasoning ingredients constitutes at least 75 wt. % of the seasoning composition.

6. The seasoning composition according to claim 1, wherein the farinaceous component has a multimodal particle size distribution with at least one maximum below 90 μm and at least one maximum above 150 μm, the farinaceous component typically has a multimodal particle size distribution with at least one maximum below 100 μm, preferably below 90 μm, and at least one maximum above 120 μm, preferably above 150 μm.

7. The seasoning composition according to claim 1, wherein the composition comprises 5-50 wt. % of plant material selected from spices, herbs, vegetables, fruit and combinations thereof.

8. The seasoning composition according to claim 1, wherein the composition comprises at least 5 wt. % of spices and/or herbs.

9. The seasoning composition according to claim 1, wherein the composition comprises 20-65 wt. % of salt selected from sodium chloride, potassium chloride, monosodium glutamate and combinations thereof.

10. The seasoning composition according to claim 1, wherein the composition contains not more than 10 wt. % water.

11. The seasoning composition according to claim 1, wherein the composition contains 0-10 wt. % fat.

\* \* \* \* \*